United States Patent Office 3,033,891
Patented May 8, 1962

3,033,891
MONO SALTS OF O-HYDROCARBYL-CARBO-ALKYLTHIOL PHOSPHONIC ACIDS
Daniel W. Grisley, Jr., Dayton, Ohio, assignor to Monsanto Chemical Company, St. Louis, Mo., a corporation of Delaware
No Drawing. Filed Nov. 27, 1959, Ser. No. 855,499
5 Claims. (Cl. 260—461)

This invention relates to the mono salts of O-hydrocarbyl-carboalkylthiol phosphonic acids. In one aspect, this invention relates to O-hydrocarbyl-O-cation-carboalkylthiol phosphonates and O-cation-bis(O-hydrocarbylcarboalkylthiol phosphonate), wherein cation is a cation selected from a group consisting of alkali metal, alkaline earth metal, ammonium and cyclohexylammonium, as new compounds. In another aspect, this invention relates to the mono-dealkylation of the S-alkyl-dihydrocarbyloxyphosphinylthioformates.

Numerous organic compounds containing both sulfur and phosphorus atoms are known to exist and to have a considerable commercial value in a great variety of useful applications. For example, the S-alkyl-dihydrocarbyloxyphosphinylthioformates have been found to be useful in preparing biological toxicant compositions. These thioformates, and their method of preparation from the alkali metal dihydrocarbyloxyphosphinylthioformates, are disclosed and claimed in the copending application Serial No. No. 832,424 of Grisley, Heininger, and Birum, filed on August 10, 1959.

I have now discovered that the S-alkyl-dihydrocarbyloxyphosphinylthioformates can be mono-dealkylated to form a mono salt of an O-hydrocarbyl-carboalkylthiol phosphonic acid in high yield without substantial dealkylation of the alkyl radical attached to the sulfur atom of the dihydrocarbyloxyphosphinylthioformate.

An object of this invention is to provide O-hydrocarbyl-O-cation-carboalkylthiol phosphonate and O-cation-bis(O-hydrocarbylcarboalkylthiol phosphonates), wherein cation is a cation selected from the group consisting of alkali metal, alkaline earth metal, ammonium, and cyclohexyl-ammonium, as new compounds.

Another object of this invention is to provide methods for the mono-dealkylation of the S-alkyl-dihydrocarbyloxyphosphinylthioformates to form the monosalts of an O-hydrocarbylcarboalkylthiol phosphonic acid.

Other aspects, objects, and advantages of the invention are apparent from a consideration of the accompanying disclosure and the appended claims.

According to the present invention, S-alkyl-dihydrocarbyloxyphosphinylthioformates are subject to the action of a dealkylation agent to form a mono-salt of an O-hydrocarbylcarboalkylthiol phosphonic acid as illustrated by the following equation:

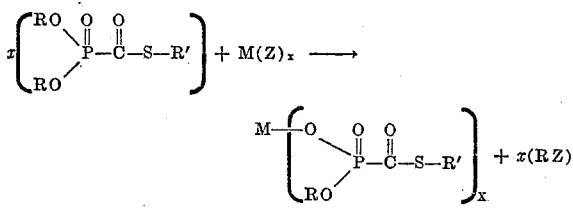

wherein R is a hydrocarbyl radical selected from the group consisting of alkyl, aralkyl, and cycloalkyl radicals of from 1 to 12 carbon atoms, R' is an alkyl radical of from 1 to 8 carbon atoms, M is a cation selected from the group consisting of alkali metal, alkaline earth metal, ammonium, and cyclohexylammonium, $x$ is an integer of 1 or 2 corresponding to the valence number of cation M, and Z is an anion selected from the group consisting of iodide, cyanide, and thiocyanate.

Also, according to the invention, there are provided, as new compounds, mono-salts of the O-hydrocarbylcarboalkylthiol phosphonic acids of the formula

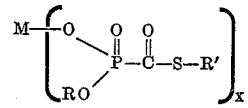

wherein R, R', $x$, and M are as above defined.

The S-alkyl-hydrocarbyloxphosphinylthioformate reactants employed in the reaction of this invention can be produced by any method known to those skilled in the art and preferably are produced by the method disclosed and claimed in application Serial No. 832,424 filed August 10, 1959, wherein alkali metal dihydrocarbyloxyphosphinylthioformates are reacted with alkyl sulfates. The hydrocarbyl radicals represented by R in the equation above preferably contain from 1 to 12 carbon atoms per molecule and are substantially free of acetylenic unsaturation. Suitable hydrocarbyl radicals include the alkyl, alkaryl, and cycloalkyl radicals. The alkyl radical, as represented in the equation above by R', preferably contains from 1 to 8 carbon atoms and can include radicals such as methyl, ethyl, propyl, n-butyl, isobutyl, n-hexyl, and the like. The alkyl radicals represented by R preferably have a straight-chain configuration; however, branched-chain alkyl radicals can be used provided there is no branched-chain on the α-carbon atom and provided that there is not more than 1 branched-chain on the β-carbon atoms. Illustrative examples of some suitable thioformate reactants include:

S-methyl-diethoxyphosphinylthioformate
S-ethyl-dipropoxyphosphinylthioformate
S-butyl-di-isobutoxyphosphinylthioformate
S-butyl-di-isohexoxyphosphinylthioformate
S-ethyl-di(2-methylpropoxy)phosphinylthioformate
S-methyl-di(2,3-dimethylpropoxy)thioformate
S-pentyl-dibenzyloxyphosphinylthioformate
S-propyl-di(β-phenylethoxy)phosphinylthioformate
S-octyl-di(β-phenylbutoxy)phosphinylthioformate
S-methyl-dicyclohexoxyphosphinylthioformate The dealkylating reactants employed in the process of this invention are of the type which ionize under reaction conditions; that is, covalent type dealkylating agents are not useful in the dealkylation of these thioformates. Suitable dealkylating agents are those wherein the cation, as represented by M in the equation above, is selected from the group consisting of an alkali metal, alkaline earth metal, ammonium, or cyclohexylammonium cations and the anions, as represented by Z in the equation above, are selected from the group consisting of iodide, cyanide, or thiocyanate anions. The alkali metals are herein defined as being sodium, potassium and lithium and the alkaline earth metals are herein defined as being magnesium, calcium, strontium and barium. Illustrative examples of suitable dealkylating agents include sodium iodide, potassium iodide, lithium iodide, magnesium iodide, barium iodide, calcium iodide, ammonium iodide, cyclohexylammonium iodide, ammoniumthiocyanate, cyclohexylammonium cyanate, sodium cyanide, and potassium cyanide. The alkali metal iodides, particularly sodium iodide are the preferred dealkylating agents.

The reaction of this invention takes place primarily by admixing the dealkylating agent with the S-alkyl-dihydrocarbyloxyphosphinylthioformate at room temperature without the necessity for using elevated temperature, elevated pressures or catalysts. Thus, the reaction can be conducted very readily at room temperature and at atmospheric pressure; however, the use of somewhat elevated temperatures is sometimes desirable in order to decrease the reaction time and obtain high yields. In general, the temperature is maintained in the range of from 20° C. to 150° C., preferably 25° C. to 50° C. The use of temperatures much above 150° C. is to be avoided since dealkylation of the alkyl group attached to the sulfur atom of the thioformate tends to take place at the higher temperatures.

The reaction is normally conducted at atmospheric pressure but either subatmospheric or superatmospheric pressures can be used if desired.

It is usually advantageous to conduct the reaction in a diluent or solvent medium, preferably a solvent in which the dealkylating agent is soluble in order to simplify the product separation procedures. However, it is not necessary that the dealkylating agent be soluble in the solvent and it may be merely suspended therein. Examples of some suitable solvents include acetone, tetrahydrofuran, dioxane, diethylcarbitol, methylethylketone, and the like.

It is essential that the dealkylation of the thioformate be conduced in an anhydrous system because of the mono-salt of the O-hydrocarbyl-carboalkylthiol phosphonic acid is very hygroscopic and readily decomposed. Also, the S-alkyl-dihydrocarbyloxphosphinyl thioformate is decomposed at elevated temperatures in the presence of water.

Ordinarily, the thioformate and dealkylating agent are contacted in stoichiometric proportions; however, an excess of the thioformate can be used if desired. An excess of the dealkylating agent should not be employed because this reactant is difficult to separate in the product recovery step.

The mono-salt of the O-hydrocarbyl-carboalkylthiol phosphonic acid salts produced as products in the process of this invention are very readily separated and recovered from the reaction mixture through the selection of suitable diluents or solvents for carrying out the dealkylation. Thus, the use of solvents such as acetone or tetrahydrofuran permits the desired product to be very readily separated and recovered by a simple filtration step since all the by-products and unconverted reactants are soluble in the solvents whereas the mono-salts of the O-hydrocarbyl-carboalkylthiol phosphonic acids are not soluble therein. Of course, other methods for separation and recovery of the product can be devised by those skilled in the art.

The mono-salts of O-hydrocarbyl-carboalkylthiol phosphonic acids provided by this invention are relatively high melting crystalline solids which are substantially white in color. These products are very hygroscopic and are fairly soluble in hot acetone and very soluble in water. They are relatively insoluble in hydrocarbon fractions, tetrahydrofuran, ethers, ethyl acetate and the like.

The mono-salts of O-hydrocarbyl-carboalkylthiol phosphonic acids provided by this invention can be represented by the formula

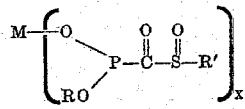

wherein $x$ is an integer of 1 or 2 corresponding to the valence of the cation represented by M. Thus, where the cation of the dealkylating agent has a valence of 1, $x$ is 1 and the product is O-hydrocarbyl-O-cation-carboalkylthiolphosphonate but where M has a valence of 2, $x$ is 2 and the product is O-cation-bis(O-hydrocarbyl-carboalkylthiolphosphonate).

Illustrative examples of O-hydrocarbyl-O-cation-carboalkylthiolphosphonates are as follows:

O-ethyl-O-sodium-carbomethylthiolphosphonate
O-methyl-O-potassium-carbo(2-methylpropyl)thiolphosphonate
O-hexyl-O-lithium-carboisobutylthiolphonphonate
O-butyl-O-sodium-carbophenylthiolphosphonate
O-methyl-O-sodium-carbocyclohexylthiolphosphonate
O-propyl-O-potassium-carbophenylethylthiolphosphonate
O-ethyl-O-ammonium-carbopropylthiolphosphonate Illustrative examples of some of the O-cation-bis(O-hydrocarbyl-carboalkylthiolphosphonate) are as follows:

O-barium-bis(O-ethyl-carbomethylthiolphosphonate)
O-calcium-bis(O-methyl-carbohexylthiolphosphonate)
O-magnesium-bis[O-(2-methylpropyl)-carboethylthiolphosphonate]
O-strontium-bis(O-iso-butyl-carbobutylthiolphosphonate)
O-calcium-bis(O-benzyl-carbopropylthiolphosphonate)
O-magnesium-bis(O-cyclohexyl-carboethylthiolphosphonate)
O-barium-bis(O-phenylbutyl-carbomethylthiolphosphonate)

The monosalts of O-hydrocarbyl-carboalkylthiol phosphonic acids provided by this invention are useful articles of commerce which may be advantageously employed as plasticizing agents for various synthetic resins, such as polyvinyl resins. They are also useful in the textile industry as surface active agents, softening agents, textile lubricants and the like. These compounds also exhibit some herbicidal activity when applied to the foliage of plants. For example, O-ethyl-O-sodium-carbomethylthiolphosphonate had moderate effect on grass and broad leaf plants when applied as a contact herbicide at a concentration of 0.50%. These compounds are also useful as agricultural fungicides when applied in concentrations of 0.25 and 0.10%.

The advantages, desirability and usefulness of the new compounds of this invention are illustrated by the following examples.

Example 1

In this example, O-ethyl-O-sodium-carbomethiolphosphonate was prepared by dealkylating S-methyl-diethoxyphosphinylthioformate with sodium iodide. In a reaction flask were placed 10.61 g. (0.05 mole) of S-methyl-diethoxyphosphinylthioformate, 7.49 g. of sodium iodide (0.05 mole) and 100 ml. of tetrahydrofuran solvent. The reaction mixture was stirred with a magnetic stirrer in a dry atmosphere at a temperature of 25° C. for a period of 9.5 hours. At the end of this time, the reaction mixture was cooled to 0° C. and the solid product was separated by filtration. The solid product was pressed dry on the filter paper and washed with ether. After drying at 60° C. and 20 mm. pressure for 1 hour, there was obtained 9.50 g. of the O-ethyl-O-sodium-carbomethylthiolphosphonate in a yield of 92%. The product was recrystallized twice from hot anhydrous acetone to yield white crystals having a melting point of 205–207° C. Elemental analysis of the product was found to be 23.19 wt. percent carbon, 3.61 wt. percent hydrogen, 15.74 wt. percent sulfur, and 15.29 wt. percent phosphorus as compared with calculated values of 23.31 wt. percent carbon, 3.91 wt. percent hydrogen, 15.56 wt. percent sulfur, and 15.03 wt. percent phosphorus. The proposed structure was confirmed by infrared analysis.

Reasonable variation and modification of the invention as described are possible, the essence of which is that there have been provided (1) mono-salts of O-hydrocarbyl-carboalkylthiol phosphonic acids as new compounds and (2) methods for dealkylating S-alkyl-dihydrocarbyloxyphosphinylthioformates to form said new compounds.

I claim:
1. An organic phosphorus compound of the formula

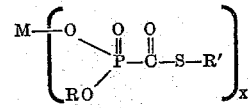

wherein R is a hydrocarbon radical selected from the group consisting of alkyl, aralkyl and cycloalkyl radicals of from 1 to 12 carbon atoms, R′ is an alkyl radical of from 1 to 8 carbon atoms, M is a cation selected from the group consisting of alkali metal, alkaline earth metal, ammonium, and cyclohexyl ammonium, and $x$ is an integer selected from the group consisting of 1 and 2 corresponding to the valence number of cation M.

2. O-ethyl-O-sodium-carbomethylthiolphosphonate.

3. The method which comprises dealkylating an S-alkyl-dihydrocarbyloxyphosphinylthioformate with an alkali metal iodide under dealkylating conditions at a temperature in the range of from 20° C. to 150° C. to form a mono-salt of an O-hydrocarbyl-carboalkylthiol phosphonic acid, and recovering said mono-salt as product.

4. The method which comprises dealkylating an S-alkyl-dihydrocarbyloxyphosphinylthioformate of the formula

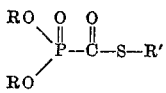

wherein R is a hydrocarbon radical selected from the group consisting of alkyl, aralkyl and cycloalkyl radicals of from 1 to 12 carbon atoms and R' is an alkyl radical of from 1 to 8 carbon atoms, with a dealkylating agent of the formula $M(Z)_x$ wherein M is a cation selected from the group consisting of alkali metal, alkaline earth metal, ammonium, and cyclohexylammonium, Z is an anion selected from the group consisting of iodide, cyanide, and thiocyanate, and $x$ is an integer selected from the group consisting of 1 and 2 corresponding to the valence number of cation M, to form an organic phosphorus compound of the formula

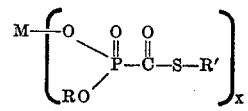

wherein M, R, R' and $x$ are as above defined, and recovering said organic phosphorus compound as product of the process.

5. The method which comprises dealkylating S-methyl-diethoxy-phosphinylthioformate with sodium iodide at a temperature in the range of from 20° C. to 150° C. and recovering O - ethyl - O - sodium - carbomethylthiolphosphonate as product.

No references cited.